US012592348B2

(12) United States Patent
Shimizu

(10) Patent No.: US 12,592,348 B2
(45) Date of Patent: Mar. 31, 2026

(54) TERMINAL MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Toru Shimizu, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 192 days.

(21) Appl. No.: 18/282,780

(22) PCT Filed: Sep. 9, 2021

(86) PCT No.: PCT/JP2021/033132

§ 371 (c)(1),
(2) Date: Sep. 18, 2023

(87) PCT Pub. No.: WO2022/201589

PCT Pub. Date: Sep. 29, 2022

(65) Prior Publication Data

US 2024/0170231 A1 May 23, 2024

(30) Foreign Application Priority Data

Mar. 26, 2021 (JP) ................................ 2021-052708

(51) Int. Cl.

*H01R 13/11* (2006.01)
*H01H 1/18* (2006.01)
*H01H 1/26* (2006.01)

(52) U.S. Cl.

CPC ................ *H01H 1/26* (2013.01); *H01H 1/18* (2013.01); *H01R 13/11* (2013.01)

(58) Field of Classification Search

CPC ............ H01H 1/26; H01H 1/18; H01H 3/161; H01H 1/24; H01R 13/24; H01R 12/774;

(Continued)

(56) References Cited

U.S. PATENT DOCUMENTS 6,071,129 A * 6/2000 Konno ................ H01R 12/716 439/74
7,168,991 B2 * 1/2007 Sano .................. H01R 13/2442 439/376

(Continued)

FOREIGN PATENT DOCUMENTS

JP 2002-274920 A 9/2002
JP 2003-007372 A 1/2003
WO 2018/116964 A1 6/2018

OTHER PUBLICATIONS

International Search Report issued on Nov. 16, 2021 for WO 2022/201589 A1 (4 pages).

*Primary Examiner* — Ahmed M Saeed
(74) *Attorney, Agent, or Firm* — Venjuris, P.C.

(57) ABSTRACT

A terminal module (10) is provided with a case (22) and a terminal fitting (16) held in the case (22). The terminal fitting (16) includes a fixing portion (52) to be fixed to the case (22) and a leaf spring portion (54) cantilevered from the fixing portion (52) and deflectably and deformably accommodated in an empty space (20) of the case (22). A contact point portion (64) provided on a tip part (62) of the leaf spring portion (54) is displaced toward the fixing portion (52) and toward one side in a plate thickness direction by deflection and deformation of the leaf spring portion (54) when being pressed by a mating contact point (14).

7 Claims, 5 Drawing Sheets

(58) Field of Classification Search
CPC ........ H01R 12/87; H01R 12/91; H01R 33/09; H01R 4/48; H01R 13/113; H01R 13/03; H01R 13/187; H01R 13/11; H01R 13/115; H01R 13/20; H01R 13/627; H01R 4/26
See application file for complete search history.

(56) References Cited

U.S. PATENT DOCUMENTS

| | | | |
|---|---|---|---|
| 2001/0018290 | A1 | 8/2001 | Aoki |
| 2014/0334128 | A1 | 11/2014 | Yamanaka et al. |

* cited by examiner

TERMINAL MODULE

CROSS REFERENCE TO RELATED APPLICATIONS

This application is a national phase of PCT application No. PCT/JP2021/033132, filed on 9 Sep. 2021, which claims priority from Japanese patent application No. 2021-052708, filed on 26 Mar. 2021, all of which are incorporated herein by reference.

TECHNICAL FIELD

The present invention relates to a terminal module.

BACKGROUND

A butting-type electrical connection structure in which facing contact points are butted against and brought into contact with each other has been conventionally known. Patent Document 1 discloses a terminal module used in a butting-type electrical connection structure developed for large current application. This terminal module includes a case made of metal and having an opening, through which a mating contact point enters, a coil spring accommodated in the case and a contact point portion biased toward the opening by the coil spring and configured to move while compressing the coil spring by being pressed by the mating contact point.

Since the adhesion of an external matter between the contact points causes a conduction failure and is not preferable in the butting-type electrical connection structure, the external matter between the contact points is removed by sliding the both contact points against each other when the both contact points are butted against each other. In the terminal module of Patent Document 1, when the contact point portion moves by being pressed by the mating contact point, the contact point portion slides in contact with a guide portion provided in the case, thereby being guided to be displaced in a direction orthogonal to a moving direction. As a result, the both contact points are slid against each other when being butted against each other.

PRIOR ART DOCUMENT

Patent Document

Patent Document 1: JP 2002-274290 A

SUMMARY OF THE INVENTION

Problems to be Solved

In the terminal module shown in Patent Document 1, the contact points can be slid against each other when being butted against each other, but the separate coil spring and a braided wire or the like for coupling an external connecting portion of a terminal fitting and the contact point to allow a displacement of the contact point are necessary. Therefore, a further improvement to simplify a structure has been required.

Accordingly, a terminal module is disclosed which can realize mutual sliding of both contact points when the contact points are butted against each other by a simple structure.

Means to Solve the Problem

The present invention is directed to a terminal module with a case including an opening, a mating contact point entering the opening, and an empty space for accommodating the mating contact point having entered through the opening, and a terminal fitting held in the case, the terminal fitting including a fixing portion to be fixed to the case and a leaf spring portion cantilevered from the fixing portion toward the opening, the leaf spring portion being deflectably and deformably accommodated in the empty space, the leaf spring portion including a base end part extending from the fixing portion toward the opening, a tip part extending from the base end part toward one side in a plate thickness direction of the base end part and a contact point portion provided on the tip part, and the contact point portion being displaced toward the fixing portion and toward the one side in the plate thickness direction by deflection and deformation of the leaf spring portion when being pressed by the mating contact point.

Effect of the Invention

According to the terminal module of the present disclosure, mutual sliding of the both contact points when the contact points are butted against each other can be realized by a simple structure.

DETAILED DESCRIPTION TO EXECUTE THE INVENTION

Description of Embodiments of Present Disclosure

Figure 1:
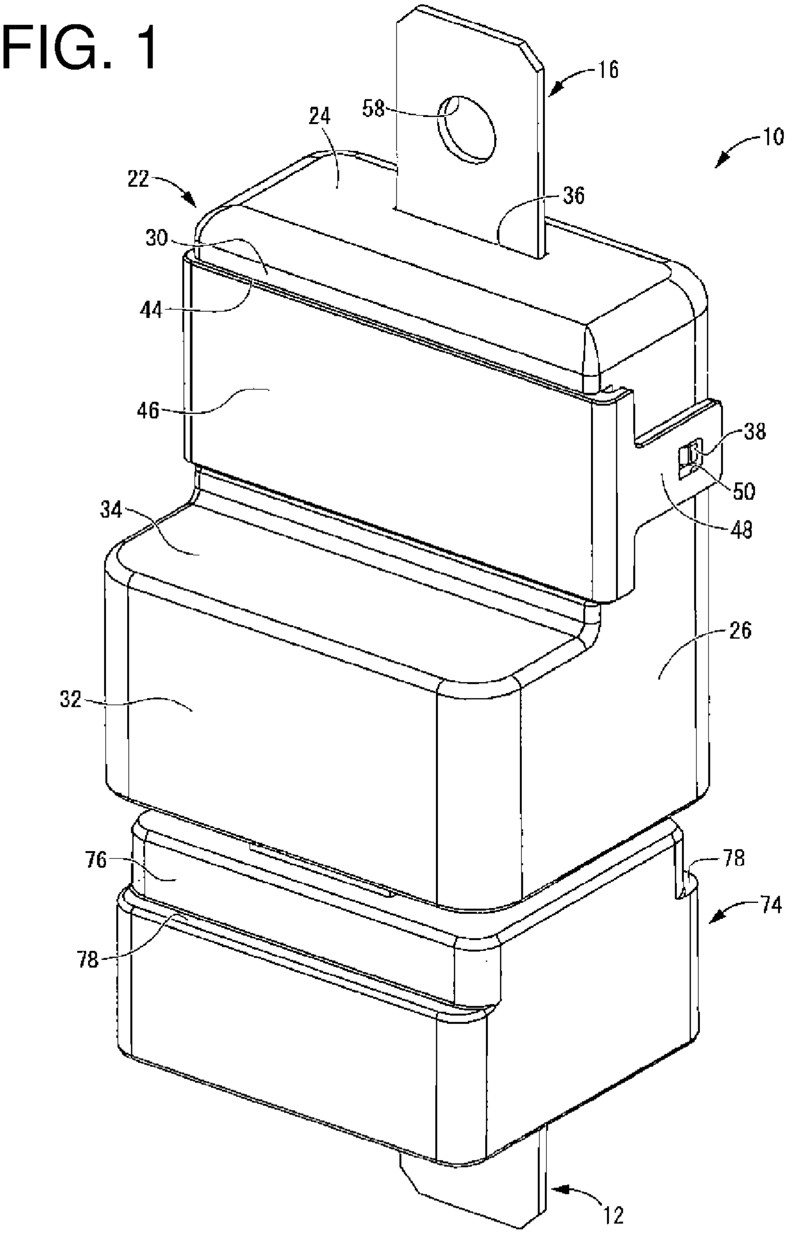
FIG. 1 is a perspective view of a terminal module according to one embodiment showing a state before connection to a mating contact point.

First, embodiments of the present disclosure are listed and described.

(1) The terminal module of the present disclosure is provided with a case including an opening, a mating contact point entering the opening, and an empty space for accommodating the mating contact point having entered through the opening, and a terminal fitting held in the case, the terminal fitting including a fixing portion to be fixed to the case and a leaf spring portion cantilevered from the fixing portion toward the opening, the leaf spring portion being deflectably and deformably accommodated in the empty space, the leaf spring portion including a base end part extending from the fixing portion toward the opening, a tip part extending from the base end part toward one side in a plate thickness direction of the base end part and a contact point portion provided on the tip part, and the contact point portion being displaced toward the fixing portion and toward the one side in the plate thickness direction by deflection and deformation of the leaf spring portion when being pressed by the mating contact point.

According to the terminal module of the present disclosure, the terminal fitting held in the case includes the leaf spring portion extending from the fixing portion fixed to the case toward the opening, through which the mating contact point enters. The leaf spring portion includes the base end part extending from the fixing portion toward the opening, the tip part extending from the base end part toward the one side in the plate thickness direction of the base end part and the contact point portion provided on the tip part, and is deflectably and deformably accommodated in the empty space of the case. In this way, when the contact point portion is pressed by the mating contact point having entered through the opening, the contact point portion is displaced toward the fixing portion of the terminal fitting and toward the one side in the plate thickness direction of the base end part by the deflection and deformation of the leaf spring portion. That is, if the mating contact point is butted against the contact point portion of the leaf spring portion, a moment rotating with a fixed point as a center of rotation and the contact point portion as a point of action is applied to the leaf spring portion. Thus, a component toward the fixing portion in a pressing direction of the mating contact point pressing the contact point portion and a component toward the one side in the plate thickness direction intersecting the pressing direction are generated as displacement direction components of the contact point portion. As a result, the both contact points can be slid against each other when being butted against each other. Particularly, since the leaf spring portion includes the base end part extending from the fixing portion toward the opening and the tip part extending from the base end part toward the one side in the plate thickness direction, the position of the contact point portion (point of action) with respect to the fixed point (center of rotation) of the leaf spring portion can be set in a range between a position immediately below the fixed point (cos $\theta=0°$) and the same position as the fixed point (cos $\theta=90°$) with the both positions excluded from the range. As a result, out of the displacement components of the contact point portion, a large component toward the one side in the plate thickness direction can be secured, and mutual sliding amounts of the both contact points can be advantageously obtained. As just described, according to the terminal module of the present disclosure, mutual sliding when the both contact points are butted against each other can be realized by a simple structure.

Note that the base end part and the tip part of the leaf spring portion may be coupled via a right-angled corner portion or may be coupled via a curved portion. The base end part may extend straight or may obliquely extend from the fixing portion toward the opening. Further, an angle of inclination may be constant or varying. The tip part may extend straight in the plate thickness direction of the base end part or may obliquely extend with respect to the plate thickness direction.

(2) Preferably, the base end part of the leaf spring portion is coupled to the tip part via a curved portion curved toward the one side in the plate thickness direction as extending toward the opening. The base end part of the leaf spring portion is more easily deflected and deformed because of the curved portion provided in the base end part, and a displacement amount when the contact point portion is butted against the mating contact point can be increased. As a result, it is possible to increase a sliding amount and a contact pressure of the contact point portion with the mating contact point.

(3) Preferably, the base end part of the leaf spring portion includes a bent portion bent toward the one side in the plate thickness direction, and a part of the base end part closer to the tip part than the bent portion is inclined toward the one side in the plate thickness direction. Since the part of the base end part closer to the tip part than the bent portion is inclined toward the one side in the plate thickness direction by the bent portion provided in the base end part, the base end part of the leaf spring portion is more easily deflected and deformed. As a result, it is possible to increase a displacement amount when the contact point portion is butted against the mating contact point and increase a sliding amount and a contact pressure of the contact point portion with the mating contact point in butting the contact point portion against the mating contact point.

Details of Embodiment of Present Disclosure

A terminal module according to an embodiment of the present disclosure is described below with reference to the drawings. Note that the present disclosure is not limited to these illustrations, but is represented by claims and intended to include all changes in the scope of claims and in the meaning and scope of equivalents.

Embodiment

Figure 2:
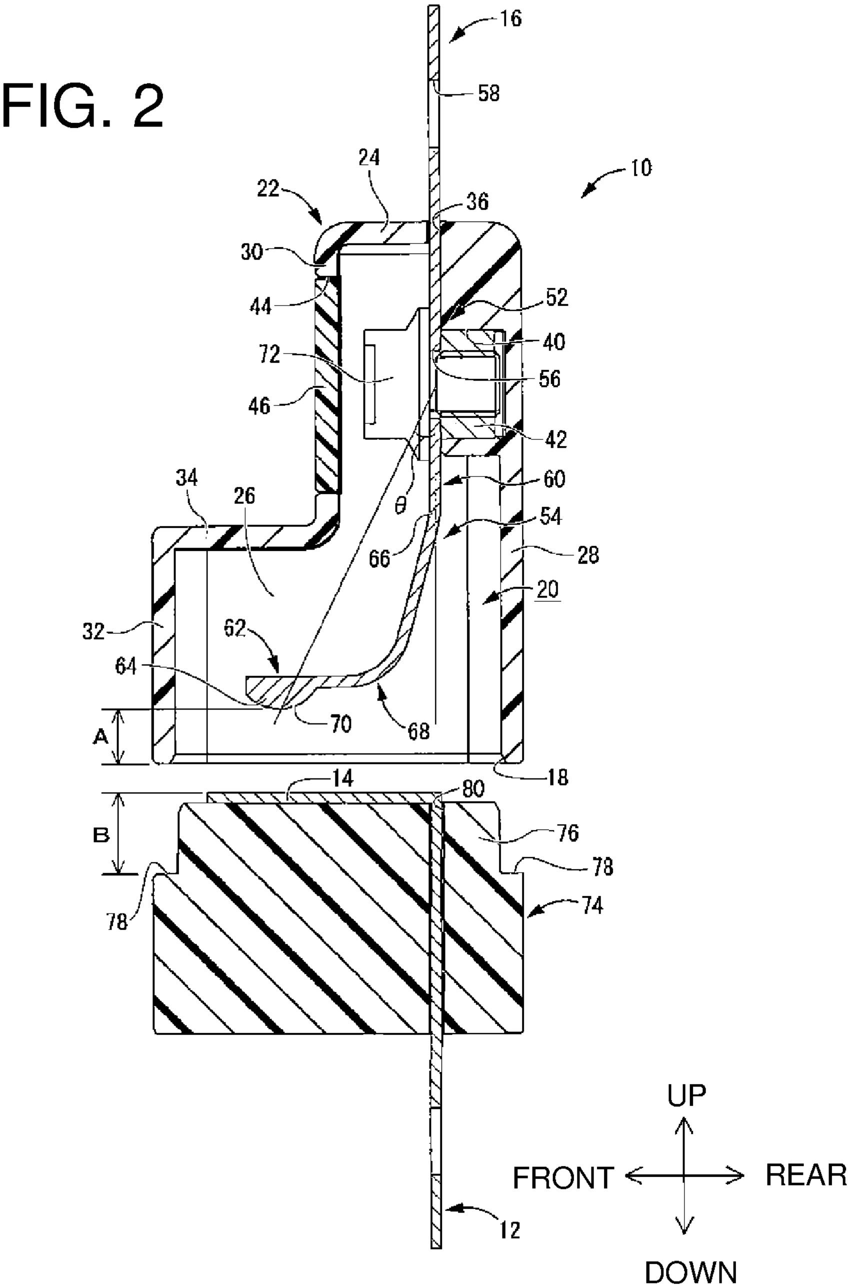
FIG. 2 is a longitudinal section of the terminal module shown in FIG. 1.
Figure 3:
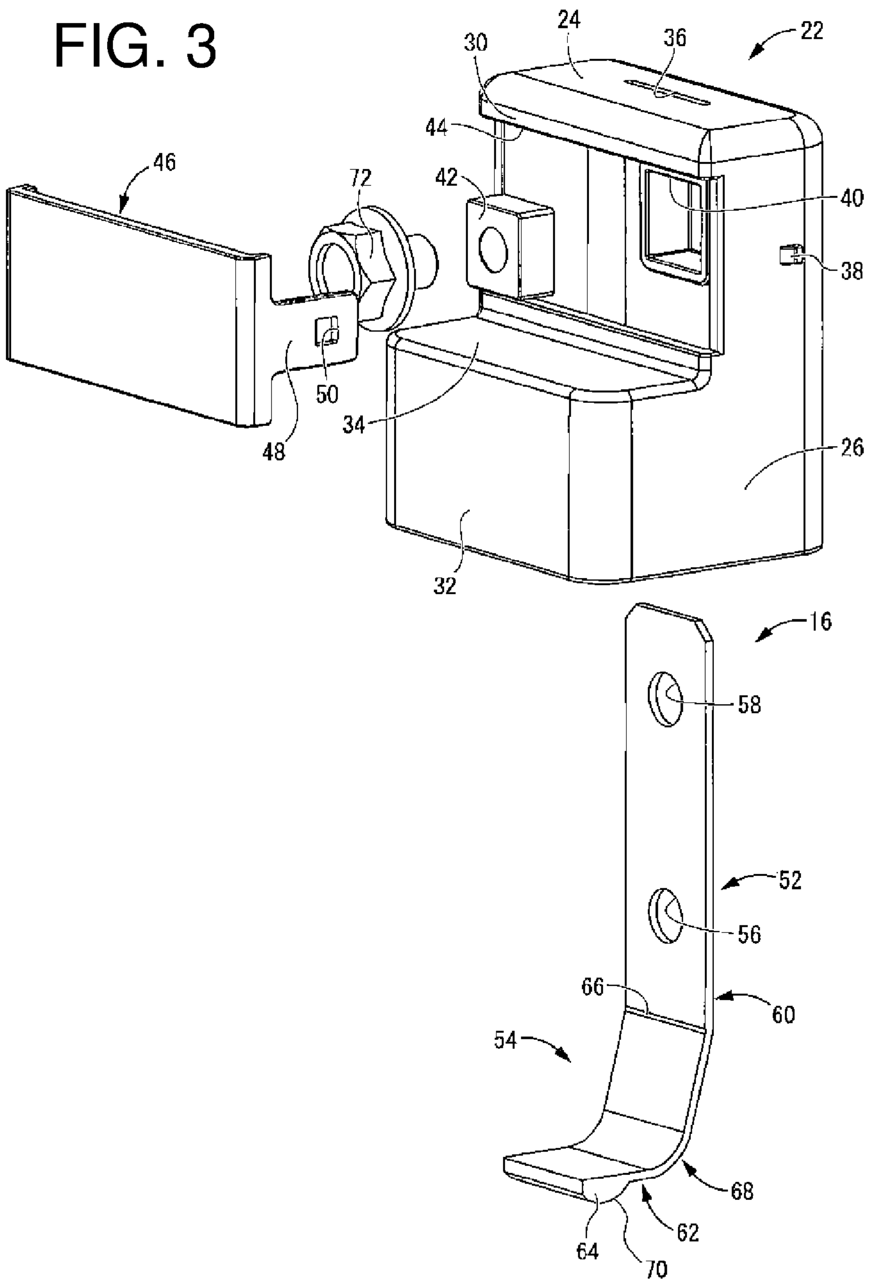
FIG. 3 is an exploded perspective view of the terminal module shown in FIG. 1.
Figure 4:
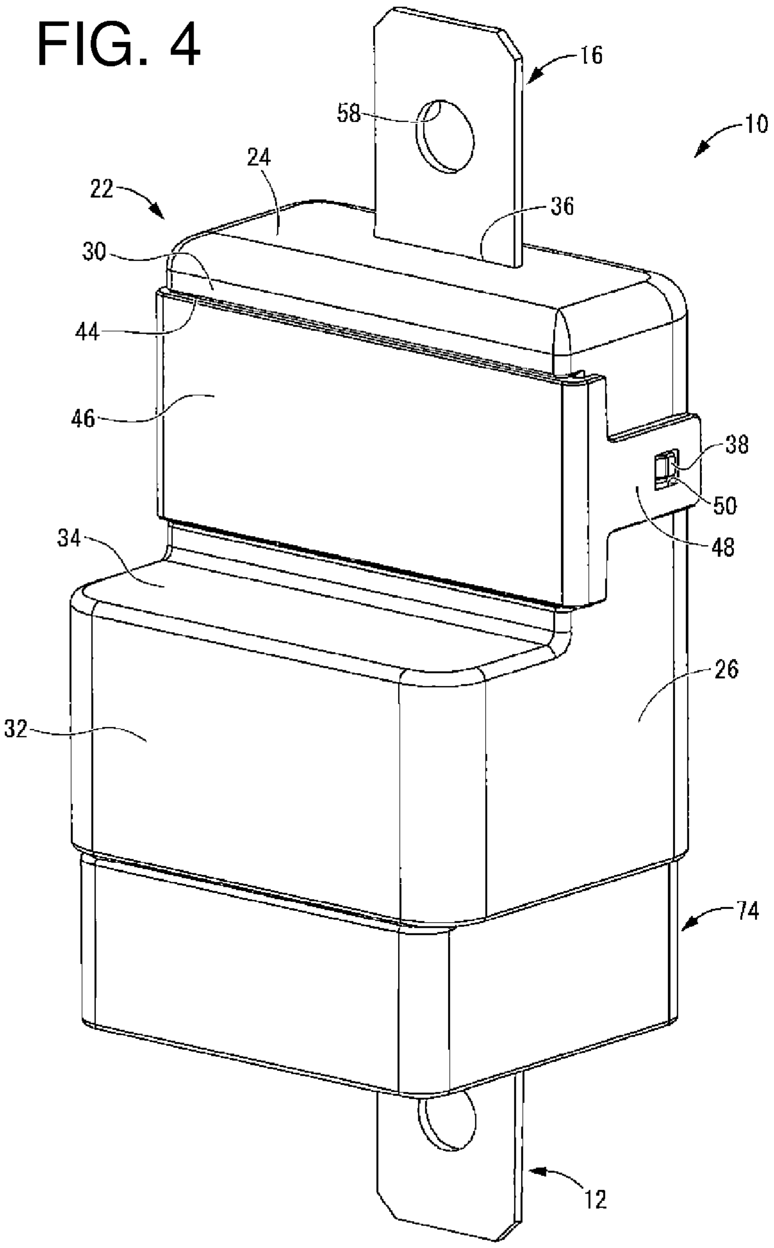
FIG. 4 is a perspective view of the terminal module shown in FIG. 1 showing a connected state to the mating contact point.
Figure 5:
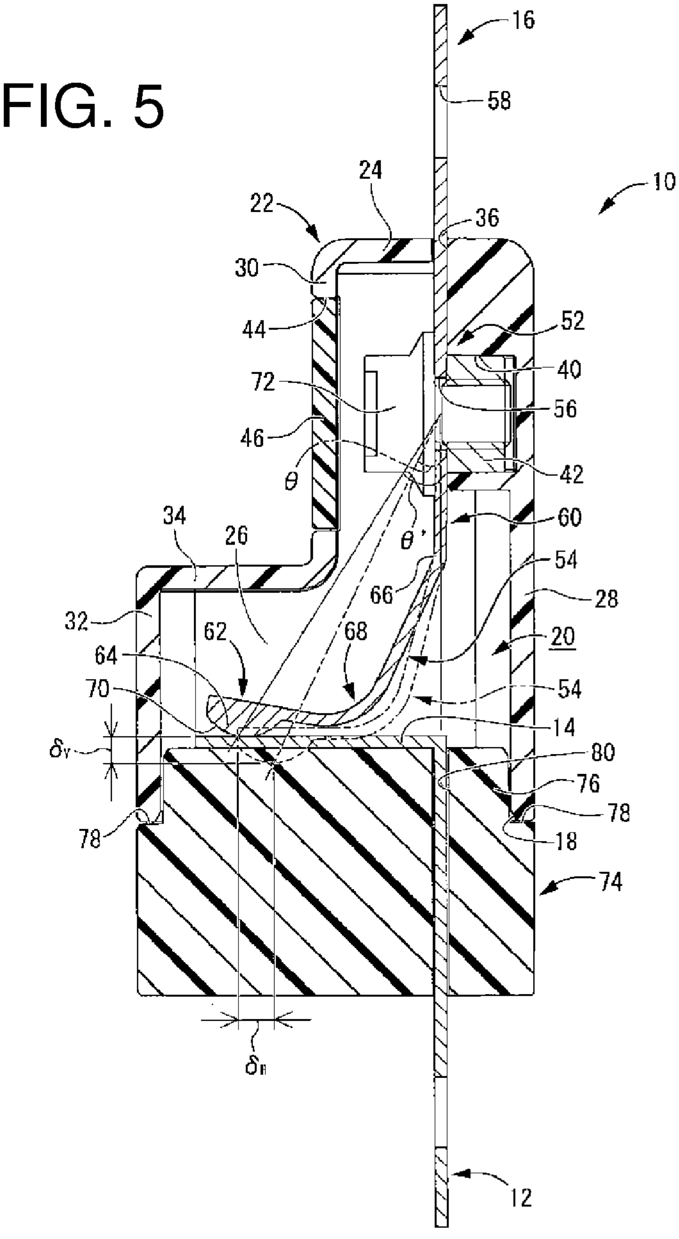
FIG. 5 is a longitudinal section of the terminal module shown in FIG. 4.

Hereinafter, a terminal module 10 of the embodiment of the present disclosure is described using FIGS. 1 to 5. The terminal module 10 is provided with a terminal fitting 16 electrically connectable to a mating contact point 14 on a mating terminal fitting 12 provided in a device such as an inverter. Note that FIGS. 1 to 3 show the terminal module 10 in a state before the terminal fitting 16 and the mating terminal fitting 12 (mating contact point 14) are connected. FIGS. 1 and 2 show the terminal module 10 in a state where the mating terminal fitting 12 (mating contact point 14) is separated downward from the terminal fitting 16. FIGS. 4 and 5 show the terminal module 10 in a state where the terminal fitting 16 and the mating terminal fitting 12 (mating contact point 14) are completely connected. The terminal module 10 can be arranged in an arbitrary orientation, but directions in the following description are based on arrows shown in FIG. 2. Note that a left side means a back side of the plane of FIG. 2, and a right side means a front side of the plane of FIG. 2. For a plurality of identical members, only some members may be denoted by a reference sign and the other members may not be denoted by the reference sign.

<Terminal Module 10>

The terminal module 10 is provided with a case 22 including an opening 18, through which the mating contact point 14 enters, and an empty space 20 for accommodating the mating contact point 14 having entered through the opening 18. The terminal fitting 16 is held in the case 22.

<Case 22>

The case 22 has a box shape open downward as a whole, and formed of insulating synthetic resin or the like. In this embodiment, the case 22 has a stepped box shape, and a lower part of the case 22 projects more forward than an upper part thereof. That is, the case 22 includes an upper wall portion 24, a pair of side wall portions 26, 26 extending downward from both sides in a lateral direction of the upper wall portion 24 and a rear wall portion 28 extending downward from a rear side of the upper wall portion 24. Further, an upper front wall portion 30 extending downward from a front side of the upper wall portion 24 is provided in an upper part of a front side of the case 22, and a lower front wall portion 32 located forward of the upper front wall portion 30 is provided in a lower part of the front side of the case 22. A step wall portion 34 extending in a horizontal direction (direction orthogonal to a vertical direction) is provided between the upper and lower front wall portions

30, 32. The lower end of the upper front wall portion 30 is connected to the step wall portion 34, and the upper end of the lower front wall portion 32 is connected to the step wall portion 34.

An internal space of the case 22 is larger in a lower part than in an upper part. As described later, the upper part of the internal space of the case 22 is a space for fixing the terminal fitting 16 to the case 22, and the lower part of the internal space of the case 22 is the empty space 20 for accommodating the mating contact point 14. That is, in the case 22, the opening 18 through which the mating contact point 14 enters is constituted by a lower opening of the case 22. Further, the empty space 20 for accommodating the mating contact point 14 having entered through the opening 18 is constituted by a space surrounded by the lower front wall portion 32, the step wall portion 34, the pair of side wall portions 26, 26 and the rear wall portion 28.

In the upper wall portion 24 of the case 22, an insertion hole 36 through which an upper end part of the terminal fitting 16 is inserted is formed to penetrate through a substantially central part in a thickness direction (vertical direction). Further, an engaging claw 38 projecting outward in the lateral direction is provided on each side wall portion 26 of the case 22. An upper part of the rear wall portion 28 of the case 22 is formed with a part thicker than a lower part. The thickened part of the rear wall portion 28 is provided with a nut accommodating portion 40 open forward, and a nut 42 is accommodated in the nut accommodating portion 40.

The upper front wall portion 30 is provided with an insertion window 44 penetrating in a thickness direction (front-rear direction). The insertion window 44 has predetermined dimensions in the vertical direction and lateral direction. In this embodiment, the insertion window 44 is formed over an entire length in the lateral direction of the upper front wall portion 30. In a single state of the case 22 before the terminal fitting 16 is fixed to the case 22, the nut accommodating portion 40 is exposed to outside through the insertion window 44. In this way, the nut 42 can be accommodated into the nut accommodating portion 40 through the insertion window 44 and a bolt 72 to be described later can be inserted and tightened into the nut 42.

This insertion window 44 is covered by a lid member 46. That is, the lid member 46 is formed in such a size as to be able to cover the insertion window 44, and mounting pieces 48, 48 projecting rearward are provided on both end parts in the lateral direction. Each mounting piece 48 is formed with an engaging hole 50 penetrating in a thickness direction (lateral direction). The lid member 46 is brought closer to the insertion window 44 from front and the respective engaging claws 38 of the case 22 are locked into the engaging holes 50, whereby the lid member 46 is fixed while covering the insertion window 44.

<Terminal Fitting 16>

The terminal fitting 16 includes a fixing portion 52 to be fixed to the case 22 and a leaf spring portion 54 cantilevered from the fixing portion 52 toward a lower side, which is the side of the opening 18, and deflectably and deformably accommodated in the empty space 20. The terminal fitting 16 is formed of electrically conductive metal. In this embodiment, as also shown in FIG. 3, the terminal fitting 16 has a substantially constant lateral dimension over an entire length and is bent into a predetermined shape. Particularly, in this embodiment, the terminal fitting 16 extends in the vertical direction, an upper part extends substantially straight in the vertical direction, and a lower part has a bent part.

A bolt insertion hole 56 penetrating in a thickness direction (front-rear direction) is formed in a lower side of a part extending substantially straight in the vertical direction in the terminal fitting 16, i.e. a substantially central part in the vertical direction in the terminal fitting 16. As described later, this bolt insertion hole 56 and an inner hole of the nut 42 provided in the case 22 are aligned and the bolt 72 inserted through the bolt insertion hole 56 is tightened into the nut 42, whereby the terminal fitting 16 is fixed to the case 22. Therefore, a part around the bolt insertion hole 56 in the terminal fitting 16, i.e. the substantially central part in the vertical direction in the terminal fitting 16, is the fixing portion 52 to be fixed to the case 22.

Further, a connection hole 58 penetrating in the thickness direction (front-rear direction) is formed in a part above the part extending substantially straight in the terminal fitting 16, i.e. an upper end part in the terminal fitting 16. In fixing the terminal fitting 16 to the case 22, the upper end part of the terminal fitting 16 projects to the outside of the case 22 through the insertion hole 36 in the upper wall portion 24 of the case 22. The terminal fitting 16 is electrically connected to an external wire or the like by an unillustrated bolt inserted through the connection hole 58.

<Leaf Spring Portion 54 of Terminal Fitting 16>

The fixing portion 52 is provided in the substantially central part in the vertical direction of the terminal fitting 16. The leaf spring portion 54 is provided below the fixing portion 52. The leaf spring portion 54 is cantilevered from the fixing portion 52. The leaf spring portion 54 is constituted by a strip fitting deflectable and deformable in a plate thickness direction, i.e. a so-called leaf spring. The leaf spring portion 54 includes a base end part 60 extending downward from the fixing portion 52 toward the opening 18, a tip part 62 extending forward, i.e. toward one side in the plate thickness direction (front-rear direction) of the base end part 60, from the base end part 60, and a contact point portion 64 provided on the tip part 62. In the terminal fitting 16, at least the leaf spring portion 54 is resiliently deformable in the plate thickness direction. Note that, in this embodiment, the entire terminal fitting 16 is integrally formed by a single strip fitting having a substantially constant plate thickness.

The base end part 60 may extend straight downward from the fixing portion 52, but includes a bent portion 66 bent toward the one side in the plate thickness direction (front-rear direction) of the base end part 60 in an intermediate part in the vertical direction in this embodiment. In this way, in the base end part 60, a part above the bent portion 66 extends straight downward and a part closer to the tip part 62 than the bent portion 66 is inclined forward, i.e. toward the one side in the plate thickness direction of the base end part, with respect to the upper part.

In a longitudinal section shown in FIG. 2, an intersection angle between the base end part 60 and the tip part 62 is not limited, but the part extending straight in the vertical direction in the base end part 60 and the tip part 62 are orthogonal to each other in this embodiment. That is, the tip part 62 extends in a horizontal direction and, in this embodiment, extends straight forward. Particularly, in this embodiment, the base end part 60 is coupled to the tip part 62 via a curved portion 68. This curved portion 68 is curved forward, i.e. toward the one side in the plate thickness direction of the base end part 60, as extending toward the opening 18, i.e. as extending downward. Thus, the base end part 60 is inclined forward by the bent portion 66 in the intermediate part in the vertical direction, and the curved portion 68 is coupled to a lower end part of the base end part 60 inclined forward and extends forward. The tip part 62 is coupled to the tip (front end) of the forward extending curved portion 68 and extends further forward from the curved portion 68.

The contact point portion 64 is a part to be brought into contact with the mating contact point 14 on the tip part 62 as described later and, in this embodiment, provided to project downward on the lower surface of the tip part 62. Particularly, in this embodiment, the contact point portion 64 is provided on a front end, which is a projecting tip, of the tip part 62, and provided substantially over an entire length in a width direction (lateral direction) of the tip part 62 (leaf spring portion 54). The shape of the contact point portion 64 is not limited, but the lower surface of the contact point portion 64 is a curved surface 70 and has a substantially semicircular shape in a longitudinal cross-section shown in FIG. 2 in this embodiment.

By forming the leaf spring portion 54 into the above shape, a downward projecting tip (substantially center in the front-rear direction of the curved surface 70) on the contact point portion 64 is at a position rotationally displaced clockwise by a predetermined angle θ with respect to the vertical direction in the longitudinal cross-section shown in FIG. 2 with a fastening part of the bolt 72 and the nut 42 to be described later, which is a fixed point of the leaf spring portion 54, as a center. This predetermined angle θ is set in a range more than 0° and less than 90°. That is, since the terminal fitting 16 includes the base end part 60 extending from the fixing portion 52 toward the opening 18 and the tip part 62 extending forward, i.e. toward the one side in the plate thickness direction of the base end part 60, from the base end part 60, the contact point portion 64 can be set within the range of the predetermined angle θ.

<Assembly of Terminal Module 10>

The terminal module 10 of this embodiment is, for example, assembled by the following method. First, the nut 42 is accommodated into and fixed to the nut accommodating portion 40 in the case 22 from front through the insertion window 44. Then, the terminal fitting 16 bent into the above shape is inserted through the lower opening (opening 18) of the case 22, and the upper end part of the terminal fitting 16 is inserted through the insertion hole 36 of the upper wall portion 24 and caused to project further upward than the upper wall portion 24. Subsequently, with the bolt insertion hole 56 in the fixing portion 52 and the inner hole of the nut 42 aligned with each other, the bolt 72 is inserted through the bolt insertion hole 56 from front and tightened into the nut 42 through the insertion window 44. Thereafter, the lid member 46 is brought closer to the insertion window 44 from front, the engaging claws 38 are locked into the engaging holes 50, and the lid member 46 is fixed to the case 22 while covering the insertion window 44. In this way, the terminal module 10 is completed.

In the terminal module 10 assembled as described above, the leaf spring portion 54 of the terminal fitting 16 is accommodated in the empty space 20 of the case 22. Particularly, since the internal space of the case 22 is shaped such that the lower part (empty space 20) projects more forward than the upper part, the tip part 62 projecting forward from the base end part 60 is accommodated well. Then, as described above, the projecting tip of the contact point portion 64 is at a position to have a center angle θ with respect to a straight line extending in the vertical direction in the longitudinal cross-section shown in FIG. 2 with the fastening part of the bolt 72 and the nut 42, which is the fixed point of the leaf spring portion 54, as a center. Further, the projecting tip of the contact point portion 64 is separated from the opening 18 of the case 22 by a predetermined dimension A (see FIG. 2) in the vertical direction.

<Connection of Terminal Module 10 and Mating Contact Point 14>

The structure of a mating device including the mating contact point 14 is not limited, but the substantially L-shaped mating terminal fitting 12 is held in a mating housing 74 in this embodiment. The mating housing 74 is provided, in an upper end part, with an inserting portion 76 to be inserted into the case 22 through the opening 18 at the time of connection to the terminal module 10. Step surfaces 78 are provided on both sides in the front-rear direction of the lower end of the inserting portion 76. An insertion hole 80, through which the mating terminal fitting 12 is inserted, is provided to penetrate through the mating housing 74 in the vertical direction. A part extending in the vertical direction in the mating terminal fitting 12 is inserted in the insertion hole 80.

The mating terminal fitting 12 is bent forward in an upper end part, and the upper end part of the mating terminal fitting 12 is arranged on the upper end surface of the inserting portion 76 and exposed to outside. A part exposed to outside in the upper end part of the mating terminal fitting 12 is the mating contact point 14. The upper end surface of this mating contact point 14 and the step surfaces 78 are separated by a predetermined dimension B (see FIG. 2) in the vertical direction. The separation distance A in the vertical direction between the projecting tip of the contact point portion 64 and the opening 18 is smaller than the separation distance B in the vertical direction between the upper end surface of the mating contact point 14 and the step surfaces 78 (A<B). Note that an end part (lower end part) opposite to the mating contact point 14 in the mating terminal fitting 12 is electrically connected to an electrically conductive member of the mating device.

To connect the terminal module 10 and the mating contact point 14, the mating housing 74 including the mating contact point 14 is first brought closer to the case 22 from below and the inserting portion 76 is inserted into the empty space 20 through the opening 18 as shown in FIGS. 4 and 5. The insertion of the mating housing 74 into the case 22 is limited, for example, by the contact of the lower end of the case 22, which is a peripheral edge part of the opening 18, with the step surfaces 78 of the mating housing 74, and any further insertion is hindered. Here, the separation distance A in the vertical direction between the projecting tip of the contact point portion 64 and the opening 18 is smaller than the separation distance B in the vertical direction between the upper end surface of the mating contact point 14 and the step surfaces 78. Therefore, by inserting the inserting portion 76 into the empty space 20, the contact point portion 64 is pressed by the mating contact point 14 and the leaf spring portion 54 is resiliently deformed as shown in FIG. 5. Note that the leaf spring portion 54 before deformation is shown by a two-dot chain line in FIG. 5.

That is, the contact point portion 64 is displaced upward toward the fixing portion 53 and forward toward the one side in the plate thickness direction of the base end part 60 by the deflection and deformation of the leaf spring portion 54 when being pressed by the mating contact point 14. Specifically, as shown in FIG. 5, the projecting tip of the contact point portion 64 is displaced upward by $\delta_V$ and displaced forward by $\delta_H$ from the position before deformation. In short, the contact point portion 64 is pressed upward by the mating contact point 14, whereby the contact point portion 64 is not only deformed upward, but also deformed forward while sliding on the upper surface of the mating contact point 14.

Such a deformation of the contact point portion 64 is caused by the contact point portion 64 being pressed by the mating contact point 14 to apply a rotational moment centered on the fixed point (fixing portion 52) to the leaf spring portion 54. By applying a pressing force by the mating contact point 14 as the rotational moment to the contact point portion 64, which is a point of action, the center angle with respect to the vertical direction, which was θ before deformation, increases to θ' as shown in FIG. 5. By this displacement in a rotation direction of the leaf spring portion 54, the contact point portion 64 is not only displaced upward, but also displaced forward. That is, the leaf spring portion 54 includes the base end part 60 extending from the fixing portion 52 toward the opening 18 and the tip part 62 extending forward toward the one side in the plate thickness direction of the base end part 60 from the base end part 60. In this way, the position of the contact point portion 64 provided on the tip part 62 is set within the range of $0° < θ \leq 90°$ not including a position immediately below the fixed point ($θ = 0°$) and the same height position as the fixed point ($θ = 90°$). In this way, a large forward displacement amount ($δ_H$) can be secured when the contact point portion 64 is pushed up by the mating contact point 14. The contact point portion 64 is set preferably within a range of $10° \leq θ \leq 50°$, more preferably within a range of $20° \leq θ \leq 45°$, with respect to the fixed point (fixing portion 52). In this way, the enlargement of the terminal module 10 can be suppressed while a large displacement amount ($δ_H$) is secured.

By applying a resilient restoring force of the leaf spring portion 54 deformed upward as a biasing force to the mating contact point 14 located below, the contact point portion 64 and the mating contact point 14 are overlapped and electrically connected with a large contact pressure. Further, the case 22 and the mating housing 74 are fixed to each other by unillustrated bolts. In this way, the contact point portion 64 and the mating contact point 14 are held in an overlapping state with a large contact pressure.

According to the terminal module 10 of this embodiment, at the time of connection to the mating contact point 14, the contact point portion 64 is pressed upward by the mating contact point 14, whereby the contact point portion 64 slides forward on the surface of the mating contact point 14. Particularly, since a rotational moment centered on the fixing portion 52 is applied to the leaf spring portion 54 by the mating contact point 14 pressing the contact point portion 64 upward, the contact point portion 64 is stably deformed forward. In this way, an external matter such as an oxide is removed by the sliding of the mating contact point 14 and the contact point portion 64 on the overlapping surfaces of the mating contact point 14 and the contact point portion 64, and the mating contact point 14 and the contact point portion 64 can be satisfactorily electrically connected. Further, since a resilient restoring force of the contact point portion 64 is applied to the mating contact point 14 according to upward deformation of the contact point portion 64, a contact pressure between the contact point portion 64 and the mating contact point 14 can also be secured. Therefore, in the terminal module 10 of this embodiment, both an effect of removing an external matter and an effect of improving a contact pressure can be accomplished.

In the leaf spring portion 54, the base end part 60 and the tip part 62 are coupled via the curved portion 68. In this way, the deformation of the substantially entire leaf spring portion 54 can be easily realized. As a result, a large deformation amount at the contact point portion 64 can be secured and the effect of removing an external matter according to a forward displacement of the contact point portion 64 is improved. Further, a downward resilient restoring force, i.e. a contact pressure with the mating contact point 14, can be improved and a satisfactory electrically connected state of the contact point portion 64 and the mating contact point 14 can be maintained as an upward deformation amount of the contact point portion 64 increases.

The base end part 60 of the leaf spring portion 54 is provided with the bent portion 66 bent forward. That is, by bending the leaf spring portion 54 forward in advance, a part closer to the tip part 62 than the bent portion 66 can be stably deformed when the contact point portion 64 is pressed by the mating contact point 14. In this way, the effect of removing an external matter and the effect of improving a contact pressure according to forward and upward displacements of the contact point portion 64 can be more stably achieved.

Modifications

Although the terminal module 10 according to the embodiment of the present disclosure has been described in detail above, the present disclosure is not limited to the embodiment. The present disclosure includes modifications, improvements and the like within a range in which the aim of the present disclosure can be accomplished. For example, the following modifications are also included in the technical scope of the present disclosure.

(1) Although the base end part 60 and the tip part 62 in the leaf spring portion 54 are coupled by the curved portion 68 in the embodiment, these may be coupled via a right-angled corner portion.

(2) Although the base end part 60 includes the bent portion 66 and the part closer to the tip part 62 than the bent portion 66 is inclined forward in the embodiment, the bent portion may not be provided. That is, for example, the base end part may substantially entirely extend straight toward the opening and be coupled to the tip part or may be substantially entirely curved and coupled to the tip part.

(3) The tip part may extend straight forward as in the embodiment or may extend forward while being inclined or curved with respect to the front-rear direction as long as the contact point portion is pressed by the mating contact point at the time of connection to the mating contact point. Therefore, the leaf spring portion may be, for example, substantially entirely curved from the fixing portion to the contact point portion.

(4) The fixing of the terminal fitting and the case is not limited to the one by a bolt as in the embodiment, but a conventionally known fixing structure such as adhesion, welding, concave-convex fitting or insert molding can be adopted.

(5) The plate thickness in the terminal fitting needs not be constant. For example, the leaf spring portion may be formed to be relatively thin to be easily resiliently deformed, and the fixing portion and the upper end part may be formed to be relatively thick to be stably connectable to the case, an external wire or the like.

(6) The specific structure of the case is not limited. For example, the case may have a substantially constant dimension in the front-rear direction substantially over the entire length in the vertical direction.

(7) Although the terminal module 10 is illustrated to be connected to the mating terminal fitting 12 provided in the mating device such as an inverter in the embodiment, there is no limitation to this mode. For example, a mating terminal to be connected to the terminal module 10 may be provided in a connector provided on an end of a wire or the like.

The terminal module 10 of the shown embodiment may be referred to as a first terminal module. An assembly or module of the mating terminal fitting 12 and the mating housing 74 may be referred to as a second terminal module. The upward direction of FIG. 2 may be referred to as an assembling direction of the first and second terminal modules. A pair of the first and second terminal modules may be referred to as a butting-type connector pair. The entire structure shown in FIG. 2 may be referred to as a butting-type electrical connection structure.

A pair of the terminal fitting 16 and the mating terminal fitting 12 of the shown embodiment may be referred to as a butting-type terminal fitting pair. The terminal fitting 16 and the mating terminal fitting 12 may be respectively referred to as a first terminal fitting and a second terminal fitting.

The mating contact point 14 of the mating terminal fitting 12 of the shown embodiment may be referred to as a flat surface or butting surface extending in a direction intersecting or orthogonal to the assembling direction of the first and second terminal modules. The mating housing 74 may be referred to as a housing block for undeflectably and undeformably supporting the mating contact point 14 of the mating terminal fitting 12.

The terminal fitting 16 of the shown embodiment may be referred to as a J-shaped terminal fitting having a free end and a fixing portion or a terminal fitting including a J-shaped leaf spring. The base end part 60 of the terminal fitting 16 may be referred to as a linear plate-like base extending in parallel to the assembling direction of the first and second terminal modules. The leaf spring portion 54 of the terminal fitting 16 can be continuous with the linear plate-like base and extend in an inclined and/or intersecting direction with respect to the assembling direction. The bent portion 66 of the terminal fitting 16 of the embodiment may be a bending line formed on a boundary between the base end part 60 and the leaf spring portion 54. The tip part 62 of the terminal fitting 16 may be referred to as a free end. The curved surface 70 of the contact point portion 64 of the terminal fitting 16 may be referred to as a pressing surface configured to contact the mating contact point 14 to wipe the mating contact point 14 and resiliently press the mating contact point 14. The displacement amount $\delta_H$ of this embodiment may be referred to as a wiping length of the contact point portion 64 of the terminal fitting 16 with respect to the mating contact point 14. The front-rear direction of FIG. 2 may be referred to as a wiping direction of the contact point portion 64 of the terminal fitting 16 with respect to the mating contact point 14. The wiping direction can be a direction orthogonal to the assembling direction. The displacement amount $\delta_V$ of the embodiment may be referred to as a deflection length of the leaf spring portion of the terminal fitting 16.

As shown in FIG. 2, when the terminal fitting 16 is not in contact with the mating terminal fitting 12, a virtual line connecting the contact point portion 64 of the terminal fitting 16 and the fixing portion 52 can be inclined at a first angle of inclination (e.g. θ) with respect to the assembling direction. As shown in FIG. 5, when the terminal fitting 16 is completely connected to the mating terminal fitting 12, a virtual line connecting the contact point portion 64 of the terminal fitting 16 and the fixing portion 52 can be inclined at a second angle of inclination (e.g. θ') larger than the first angle of inclination with respect to the assembling direction. The first angle of inclination (e.g. θ) and the second angle of inclination (e.g. θ') may be acute angles.

As shown in FIG. 2, when the terminal fitting 16 is not in contact with the mating terminal fitting 12, the contact point portion 64 of the terminal fitting 16 may be separated from the fixing portion 52 by a first distance in the assembling direction and may be separated from the fixing portion 52 by a second distance smaller than the first distance in the front-rear direction (wiping direction) orthogonal to the assembling direction.

As shown in FIG. 5, when the terminal fitting 16 is completely connected to the mating terminal fitting 12, the contact point portion 64 of the terminal fitting 16 may be separated from the fixing portion 52 by a third distance smaller than the first distance in the assembling direction. In an example of FIGS. 2 and 5, the third distance corresponding to a state after the deformation of the terminal fitting 16 is smaller than the first distance corresponding to a state before the deformation of the terminal fitting 16 by the displacement amount $\delta_V$. When the terminal fitting 16 is completely connected to the mating terminal fitting 12, the contact point portion 64 of the terminal fitting 16 may be separated from the fixing portion 52 by a fourth distance larger than the second distance in the front-rear direction (wiping direction) orthogonal to the assembling direction.

The present disclosure includes the following implementation examples. Reference numerals of several constituent elements of illustrative embodiments are given not for limitation, but for understanding assistance. Matters described in the following implementation examples may be partly omitted or several of the matters described in the implementation examples may be selected or extracted and combined.

Addendum 1

One or more implementation examples of the present disclosure are directed to a butting-type electrical connection structure with a first terminal module (10) and a second terminal module (12, 74),

- the first terminal module (10) and the second terminal module (12, 74) may be configured to be assembled in an assembling direction,
- the first terminal module (10) can be provided with a J-shaped first terminal fitting (16) including an electrically conductive free end (62, 64) and a fixing portion (52) and a case (22) for fixedly supporting the fixing portion (52) of the first terminal fitting (16) and deflectably and deformably supporting the first terminal fitting (16),
- the second terminal module (12, 74) can be provided with a second terminal fitting (12) including an electrically conductive flat surface (14) extending in a direction intersecting or orthogonal to the assembling direction and a housing block (74) for undeflectably and undeformably supporting the second terminal fitting (12), and
- when the first terminal module (10) and the second terminal module (12, 74) are assembled in the assembling direction, the electrically conductive free end (62, 64) of the first terminal fitting (16) presses the electrically conductive flat surface (14) of the second terminal fitting (12) in the assembling direction and wipes the electrically conductive flat surface (14) by a wiping length ($\delta_H$) in a wiping direction orthogonal to the assembling direction.

Addendum 2

In a certain implementation example of the present disclosure, a virtual line connecting the electrically conductive free end (62, 64) of the first terminal fitting (16) and the fixing portion (52) can be inclined at a first angle of inclination (e.g. θ) with respect to the assembling direction when the electrically conductive free end (62, 64) of the first terminal fitting (16) is not in contact with the electrically conductive flat surface (14) of the second terminal fitting (12), and a virtual line connecting the electrically conductive free end (62, 64) of the first terminal fitting (16) and the fixing portion (52) can be inclined at a second angle of inclination (e.g. θ') larger than the first angle of inclination with respect to the assembling direction when the electrically conductive free end (62, 64) of the first terminal fitting (16) is completely connected to the electrically conductive flat surface (14) of the second terminal fitting.

LIST OF REFERENCE NUMERALS

10 terminal module
12 mating terminal fitting
14 mating contact point
16 terminal fitting
18 opening
20 empty space
22 case
24 upper wall portion
26 side wall portion
28 rear wall portion
30 upper front wall portion
32 lower front wall portion
34 step wall portion
36 insertion hole
38 engaging claw
40 nut accommodating portion
42 nut
44 insertion window
46 lid member
48 mounting piece
50 engaging hole
52 fixing portion
54 leaf spring portion
56 bolt insertion hole
58 connection hole
60 base end part
62 tip part
64 contact point portion
66 bent portion
68 curved portion
70 curved surface
72 bolt
74 mating housing
76 inserting portion
78 step surface
80 insertion hole

What is claimed is:

1. A butting-type connector pair, comprising:

a first terminal module including a first terminal fitting and a case for holding the first terminal fitting; and a second terminal module including a second terminal fitting having a mating contact point, and a housing block for undeflectably and undeformably supporting the mating contact point of the second terminal fitting, the case of the first terminal module including an opening, the mating contact point of the second terminal fitting entering the opening in an assembling direction, and an empty space for accommodating the mating contact point having entered through the opening; and the first terminal fitting including a fixing portion to be fixed to the case and a leaf spring portion cantilevered from the fixing portion toward the opening, the leaf spring portion being deflectably and deformably accommodated in the empty space, the leaf spring portion including a base end part extending from the fixing portion toward the opening, a tip part extending forward from the base end part toward one side in a plate thickness direction of the base end part and a contact point portion provided on the tip part, the contact point portion of the first terminal fitting being pressed by the mating contact point undeflectably and undeformably supported in the housing block and displaced toward the fixing portion and toward the one side in the plate thickness direction by displacement amounts by deflection and deformation of the leaf spring portion when the housing block of the second terminal module and the case of the first terminal module are linearly assembled in the assembling direction, the mating contact point including a flat surface extending in an orthogonal direction with respect to the assembling direction, and the pressing of the mating contact point against the contact point portion causing the contact point portion to be deformed forward while sliding on the flat surface of the mating contact point in a direction parallel to the orthogonal direction.

2. The butting-type connector pair of claim 1, wherein the base end part of the leaf spring portion is coupled to the tip part via a curved portion curved toward the one side in the plate thickness direction as extending toward the opening.

3. The butting-type connector pair of claim 1, wherein the base end part of the leaf spring portion includes a bent portion bent toward the one side in the plate thickness direction, and a part of the base end part closer to the tip part than the bent portion is inclined toward the one side in the plate thickness direction.

4. The butting-type connector pair of claim 1, wherein the housing block has an upper end part provided with an inserting portion to be inserted into the case through the opening of the case in connecting the second terminal module to the first terminal module, and the inserting portion has a lower end provided with a stepped surface formed on either side of the housing block in the front-rear direction.

5. The butting-type connector pair of claim 4, wherein the mating contact point of the second terminal fitting has an upper end surface forming the flat surface on which the contact point portion slides, the contact point portion of the first terminal fitting has a pressing surface configured to contact the mating contact point, the pressing surface of the contact point portion is separated from the opening of the case by a first separation distance in a vertical direction of the case, the upper end surface of the mating contact point is separated from the stepped surface of the housing block by a second separation distance in a vertical direction of the housing block, and the first separation distance is smaller than the second separation distance.

6. The butting-type connector pair of claim 1, wherein the mating contact point is undeflectably and undeformably supported in the housing block by the housing block being configured to receive a lower end part of the second terminal fitting in an insertion hole formed through the housing block in a direction parallel to the assembling direction, and the second terminal fitting having an upper end part that is bent forward to be supported by an inserting portion of the housing block and to be exposed outside the housing block, the upper end part forming the mating contact point of the second terminal fitting.

7. The butting-type connector pair of claim 1, wherein the first terminal fitting is configured to dispose the contact point portion within a range of $20° \leq \theta \leq 45°$ with respect to the fixing portion, the range configured to suppress a size of the first terminal module while securing a large forward displacement of the contact point portion when the mating contact point is pressed against the contact point portion.

* * * * *